(12) United States Patent
Tuan

(10) Patent No.: US 8,146,045 B1
(45) Date of Patent: Mar. 27, 2012

(54) HIGH-LEVEL CIRCUIT ARCHITECTURE OPTIMIZER

(75) Inventor: Tim Tuan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 819 days.

(21) Appl. No.: 12/188,066

(22) Filed: Aug. 7, 2008

(51) Int. Cl.
*G06F 17/50* (2006.01)

(52) U.S. Cl. ......... 716/132; 716/133; 716/134; 716/135

(58) Field of Classification Search ................... 716/116, 716/132, 133, 134, 135
See application file for complete search history.

(56) References Cited

U.S. PATENT DOCUMENTS

| | | | |
|---|---|---|---|
| 6,470,482 B1 * | 10/2002 | Rostoker et al. | 716/102 |
| 7,725,845 B1 * | 5/2010 | White et al. | 716/132 |
| 2006/0015829 A1 * | 1/2006 | De Smedt et al. | 716/2 |

OTHER PUBLICATIONS

Rahman, Arifur et al., "Heterogeneous Routing Architecture for Low-Power FPGA Fabric," *Proceedings of the IEEE 2005 Custom Integrated Circuits Conference*, Sep. 18-21, 2005, pp. 183-186, San Jose, California.

Wächter, Andreas et al., "Large-Scale Nonlinear Optimization in Circuit Tuning," preprint submitted to Elsevier Science on May 27, 2003, available from http://citeseer.ist.psu.edu/cache/papers/cs/31541/http:zSzzSzwww.research.ibm.comzSzpeoplezSzczSzchanduzSzpars03.pdf/large-scale-nonlinear-optimization.pdf.

* cited by examiner

*Primary Examiner* — Vuthe Siek
(74) *Attorney, Agent, or Firm* — W. Eric Webostad; Gerald Chan; Thomas George

(57) ABSTRACT

A method for optimizing a high-level circuit architecture for an integrated circuit is described. Descriptions of components of the circuit architecture and optimization goals for the components are received. At least one stopping criterion for the cost functions is received. Implementations for the components are iteratively generated to provide a system from a combination of the implementations. The implementations of the components are iteratively optimized until the at least one stopping criterion is satisfied. The optimizing includes obtaining estimation models for determining cost estimates for the implementations and iteratively optimizing the implementations responsive to the cost estimates.

20 Claims, 6 Drawing Sheets

HIGH-LEVEL CIRCUIT ARCHITECTURE OPTIMIZER

FIELD OF THE INVENTION

The invention relates to integrated circuit devices (ICs). More particularly, the invention relates to a high-level circuit architecture optimizer for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

A problem with SPICE and Versatile Place & Route ("VPR") simulation of circuits, such as heterogeneous System-on-Chips ("SOCs"), is that such simulations are done at a low level, involving a significant number of details and constraints. Such simulations are thus not well-suited for broad-based initial evaluation of a potential circuit architecture.

SUMMARY OF THE INVENTION

One or more aspects of the invention generally relate to integrated circuit devices (ICs) and, more particularly, to a high-level circuit architecture optimizer for an IC.

An aspect of the invention relates generally to a method for circuit architecture optimization. Descriptions of components of the circuit architecture and optimization goals for the components are input. At least one stopping criterion for the cost functions is input. Implementations for the components are iteratively generated to provide a system from a combination of the implementations. The implementations of the components are iteratively optimized until the at least one stopping criterion is satisfied. The optimizing includes obtaining estimation models for determining cost estimates for the implementations and iteratively optimizing the implementations responsive to the cost estimates.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
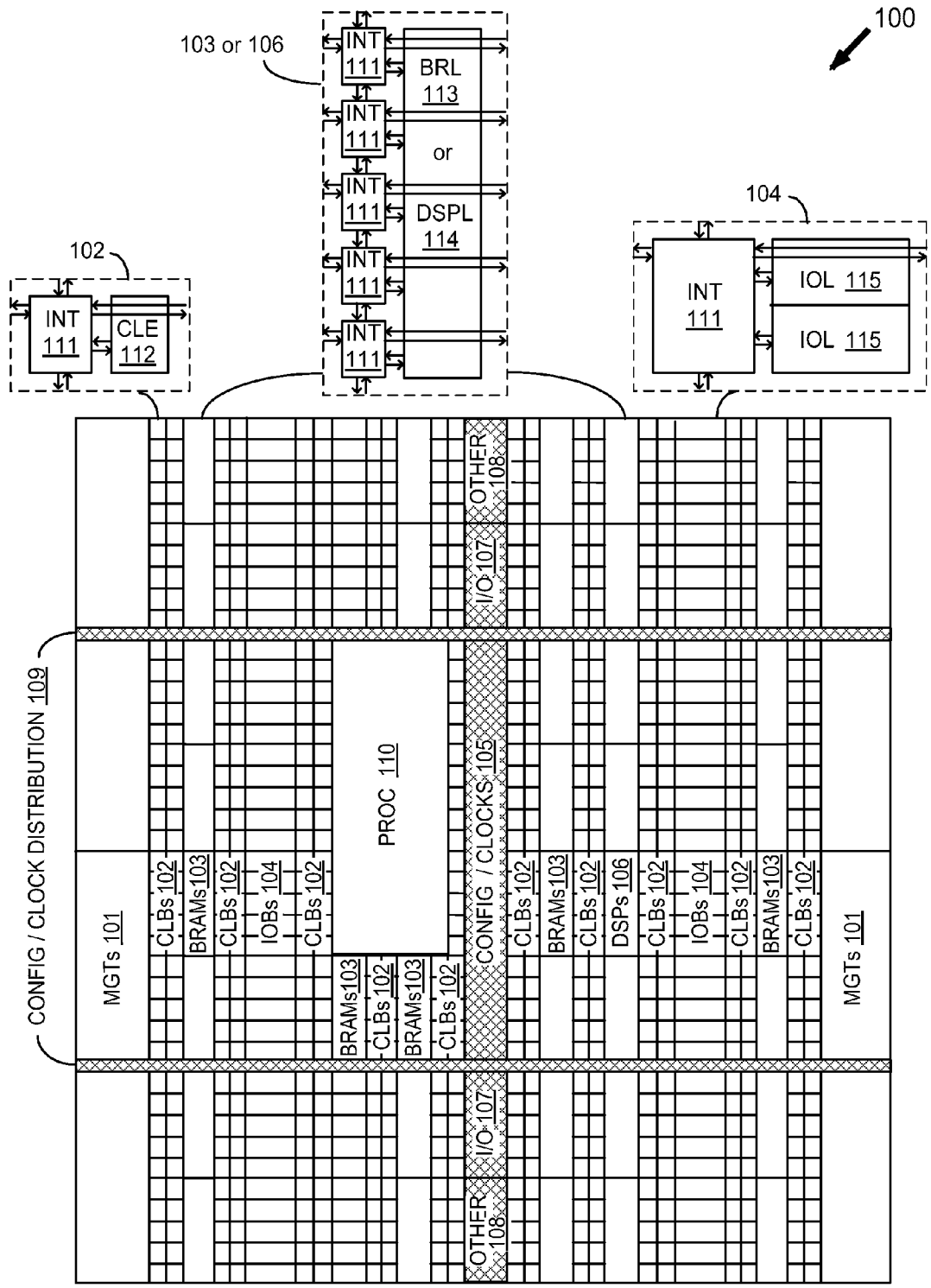
FIG. 1 is a simplified block diagram depicting an exemplary embodiment of a columnar Field Programmable Gate Array ("FPGA") architecture in which one or more aspects of the invention may be implemented.

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Additionally, in the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it should be appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present system and methods also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Circuit optimizers for rapid evaluation of circuit functions under arbitrary design goals are described. In contrast to prior Versatile Place & Route ("VPR"), the circuit optimizer tool described may be used to optimize circuits to arbitrary design goals other than circuit delay. Such additional arbitrary design goals include energy usage and area. For architecting a circuit, circuit optimizers described herein facilitate evaluation of a broad range of architectures where different functions are optimized for different design goals. For example, a designer may architect a system-on-a chip or system on chip ("SOC") to have a combination of two or more of semiconductor area, speed, and power as being optimized for a proposed architecture. By providing a tool that allows a variety of design goals to be targeted, architectures may be designed having various trade-offs between conflicting design requirements such as speed, power, and area. Furthermore, this optimization may take place at an early stage of design, without having to have implementation details associated with SPICE or VPR modeling. Along those lines, it should be understood that such early stage of a design may be at a preliminary data sheet specification level.

Figure 2:
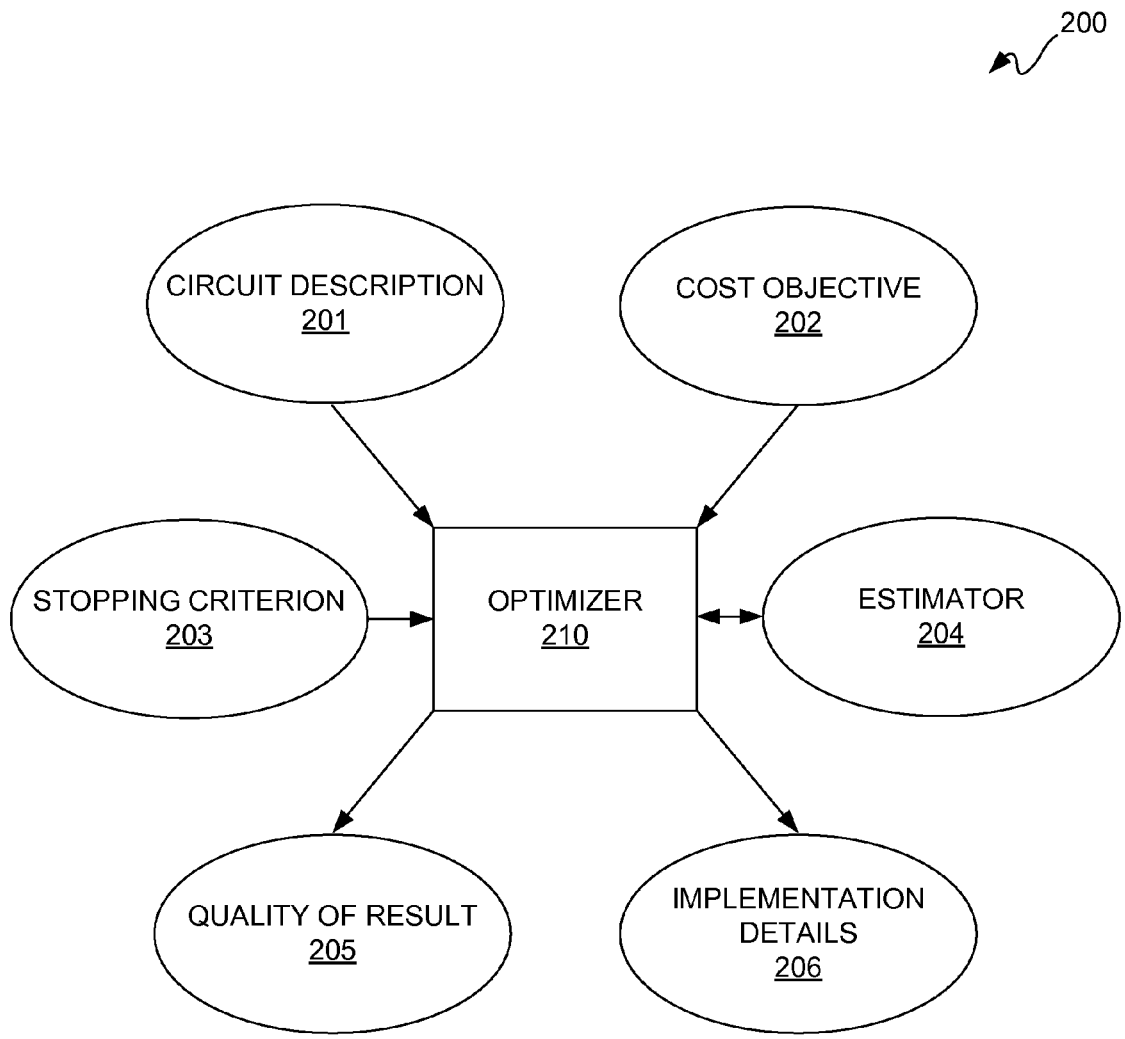
FIG. 2 is a flow diagram depicting an exemplary embodiment of a circuit optimizer tool including an optimizer.

FIG. 2 is a flow diagram depicting an exemplary embodiment of a circuit optimizer tool 200 including an optimizer 210. Optimizer 210 receives as input a circuit description 201 and a cost function or objective 202. Circuit optimizer 210 works to resolve a circuit implementation from circuit description 201 that minimizes cost as computed by cost objective 202. During such optimization, optimizer 210 relies on estimation models ("estimator") 204 to evaluate intermediate implementations.

After some stopping criterion 203 is reached, optimizer 210 outputs implementation details 206 of a best solution found and outputs the cost, namely quality of result 205, of such implementation details 206. Implementation of circuit optimizer tool 200 is described in additional detail below.

Circuit description 201 is one of the inputs to optimizer 210. Circuit description 201 may range from a simple description to a complex description. For example, a simple description might be a type of circuit function, for example a NAND gate and its key parameters, such as the number of its inputs. Circuit description 201 however may be as complex as a transistor-level netlist. Regardless of whether a simple, a complex, or an intermediately complex circuit description 201 is input, such circuit description 201 is to convey enough detail for optimizer 210 to perform a reasonable estimate of a circuit's delay, energy consumption, and area properties. In addition to functional descriptions, circuit description 201 may also include information about input drive strength and output load.

A goal of optimizer 210 is to find a good, such as a near-optimal, implementation of a target circuit, which consists of a set of design parameters. Examples of design parameters that may make up an implementation may include transistor sizes and circuit topology. For example a four-to-one multiplexer may be implemented as one stage or two stages. Implementation parameters may further include supply voltage, threshold voltage, and oxide thickness in situations that allow multiple supplies, thresholds, and oxides, respectively. Thus, in addition to functional descriptions, drive strength and output load may be part of circuit description 201 as well as a set of design parameters and implementation parameters.

Optimizer 210 may be configured to perform a linear optimization, a nonlinear optimization ("NLO"), or a combination thereof. Thus, for example, at least a first portion of components, or more particularly considered implementations thereof, may be optimized using NLO, and thus any remaining second portion of such components may be optimized using a linear optimization. NLO offers a convenient mechanism for optimization problems that are not readily mapped to linear functions. Various linear and NLO programs that may be used may be found at http://www-unix.mcs.anl.gov/otc/Guide/faq/linear-programming-faq.html and http://www-unix.mcs.anl.gov/otc/Guide/faq/nonlinear-programming-faq.html, respectively.

Optimizer 210 is configured to optimize a target circuit as determined using cost objective 202. Cost objective 202 may be any function of key circuit attributes that may be evaluated by optimizer 210. For example, a cost objective 202 may be:

$$f=DP^2A^{1.5}, \qquad (1)$$

where D is delay, P is power, and A is area. This cost function, f, of Equation (1) places the highest importance on reducing power followed by area and then by delay. To optimize this cost function of Equation (1), optimizer 210 is configured to evaluate circuit delay, circuit power, and circuit area for a target circuit to be implemented. This optimization may be performed using estimation models 204, as described below in additional detail.

Figure 3:
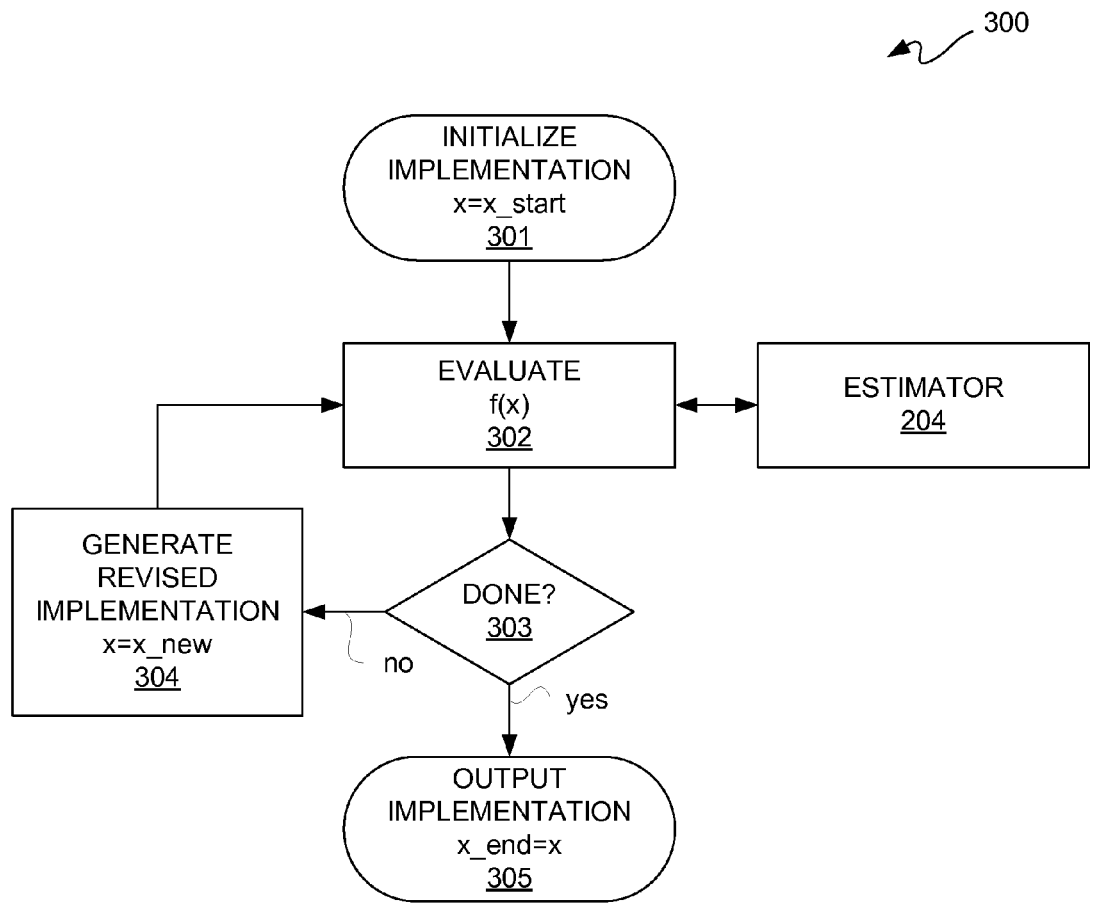
FIG. 3 is a flow diagram depicting an exemplary embodiment of optimization flow.

FIG. 3 is a flow diagram depicting an exemplary embodiment of optimization flow 300. As software packages for NLO solvers can be obtained from the public domain, as indicated above, or purchased, such NLO solvers are not described in unnecessary detail.

Basically, an NLO problem consists of an object function such as:

$$f(x), x=(x_0, x_1, \ldots x_n). \qquad (2)$$

To minimize f(x), a set of constraints consisting of both equalities and inequalities may be used, such as either or both of:

$$g_i(x)=0, \text{ and} \qquad (3)$$

$$h_j(x)\leq 0. \qquad (4)$$

For example, a circuit with two input parameters, $x=(x_1, x_2)$, maybe optimized using the cost function of Equation (1), where delay, power, and area are all expressed as functions of x. Furthermore, for this example there may be a constraint imposed upon $x_1$ and $x_2$. For purposes of clarity by way of example and not limitation, $x_1$ and $x_2$ may be required to be at least 0.2 (e.g., minimum transistor size), and $x_2$ may be required to be twice the value of $x_1$. The example problem may be set up with the object function f(x) as follows:

$$f(x)=D(x)P(x)^2A(x)^{1.5}. \qquad (5)$$

For the example problem, the constraints may be set as follows:

$$g_0(x): x_1 \geq 0.2 \qquad (6)$$

$$g_1(x): x_2 \geq 0.2 \qquad (7)$$

$$h_0(x): x_1 - 2x_2 = 0 \qquad (8)$$

With reference to FIG. 3, at 301 the implementation parameters are initialized as indicated by Equations (5) through (8), and generally indicated by the pseudo code notation x=x_start. Using Equations (5) through (8), f(x) may be evaluated at 302 using various estimation models 204. More particularly, two or more of delay, power, and area estimates are made of f(x) at 302 using estimation models 204. Estimation models 202 may be complex; however, simple estimation models may achieve acceptable accuracy and fidelity. Furthermore, using simple estimation models instead of detailed SPICE simulations facilitates evaluation by optimizer 210 of FIG. 2 of hundreds to thousands of implementations per second instead of one implementation per several seconds.

After each evaluation of f(x) at 302, it may be determined whether such evaluation has obtained an optimal or near optimal result at 303. If such circuit implementation has not reached a stopping criterion 203 of FIG. 2 as determined at 303, a revised implementation, as generally indicated by the pseudo code notation x=x_new, is generated at 304 for evaluation at 302. If, however, at 303 it is determined that a stopping criterion has been met, as generally indicated by the pseudo code notation x_end=x, the current implementation, as well as the quality of such implementation, is output at 305.

Figure 4:
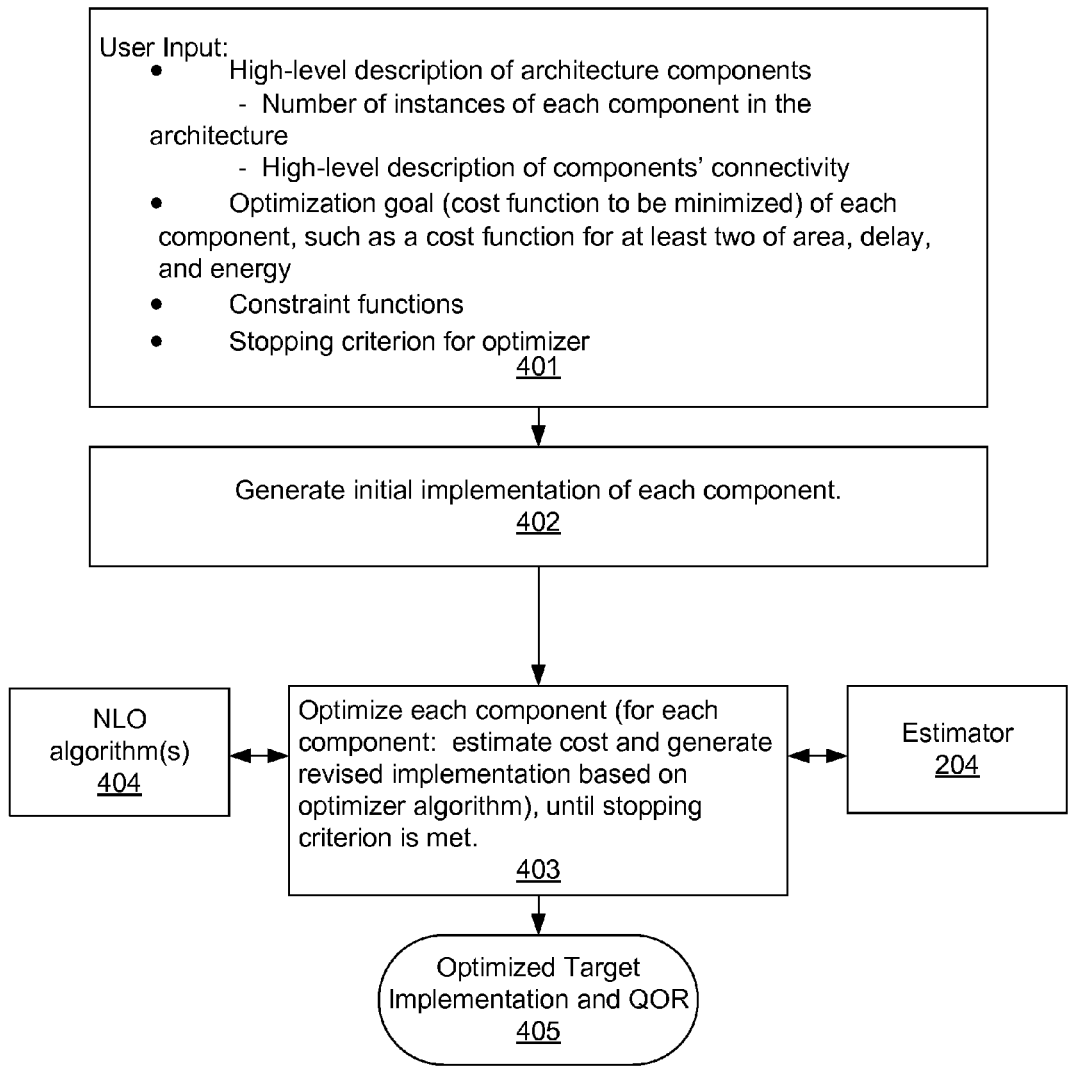
FIG. 4 is a flow diagram depicting an exemplary embodiment of another optimization flow.

FIG. 4 is a flow diagram depicting an exemplary embodiment of an optimization flow 400. Optimization flow 400 is similar to optimization flow 300, except additional details regarding producing an optimized target implementation, namely quality of result 205 and implementation details 206 of FIG. 2 are described.

At 401 user input is provided. User input may include a high-level description of components of a circuit architecture to be implemented. For example, such description may include the number of inputs to multiplexers, the number of inputs to look-up tables, the number of inputs to NAND gates, and so forth. Additionally, user input may include the number of instances of each component in the architecture. This high-level description may further include component connectivity. For example, the high-level description may include an indication of which circuit drives which other circuits, such as circuit A drives circuits B and C.

In addition to the high-level description of the architecture, user input may include the optimization goal of each component, such as a cost function for at least two of area, delay, and energy. This optimization goal is the cost function to be minimized. User input may further include constraints functions. For example, transistor sizes may be specified to be greater than a minimum size. Additionally, user input may include the stopping criterion 203 for optimizer 210 of FIG. 2.

Responsive to the high-level description of architecture components obtained at 401, as well as any constraints functions, an initial implementation of each component is generated at 402. Examples of such initial implementations may be a transistor netlist, a switch netlist, a gate netlist, a register transfer language ("RTL") netlist, or some other way of textually describing a circuit implementation of each component.

At 403, each component is optimized until the stopping criterion input by a user at 401 is met. For component optimization, each component has its cost estimated using the cost function input at 401 for a least two or more of area, delay, and energy. Based on the results of such cost function estimation, a revised implementation from the implementation initially obtained at 402 is generated using an optimizer algorithm, such as one or more NLO algorithms 404. Again, NLO algorithms 404 are well known, and thus are not described in unnecessary detail herein.

The estimated cost for each component is determined using one or more estimation models 204. Thus, one or more estimation models 204 and one or more NLO algorithms 404 are used for the operations of 403. Examples of estimation models include total transistor gate area model, Elmore delay model, RC delay model, electrical effort delay model, and sum of switched capacitance energy model, among other known estimation models. For example, to estimate delay, a circuit may be modeled as an RC network and the Elmore delay model may be applied thereto. To estimate energy, junction capacitances, gate capacitances, and substantial wire capacitances along a signal path may be summed up to find an approximate of the total capacitance switch per transition. To estimate area, the area of each transistor may be summed. For enhanced accuracy, an area model may be refined by studying examples of layouts to see how a basic model may be adjusted according to circuit style.

Even though it has been assumed that cost functions would be nonlinear, it is possible that cost function or cost functions are linear. Linear or nonlinear, or a combination thereof, cost functions may be used. Accordingly, optimizer 210 may employ both or either NLO algorithms or linear optimization algorithms.

Once a stopping criterion is met at 403, optimized, to include without limitation nearly optimized, implementation details 206 and quality of result 205 information may be output at 405. It should be appreciated that the level of detail in order to obtain a target architecture is significantly diminished in comparison to for example a SPICE simulation. The high-level architecture view of components may be at the datasheet level of components in contrast to SPICE level detail or VPR level detail. Moreover, specifications of different components such as in a heterogeneous SOC, may be used, as described below in additional detail with reference to FIG. 6.

Figure 5:
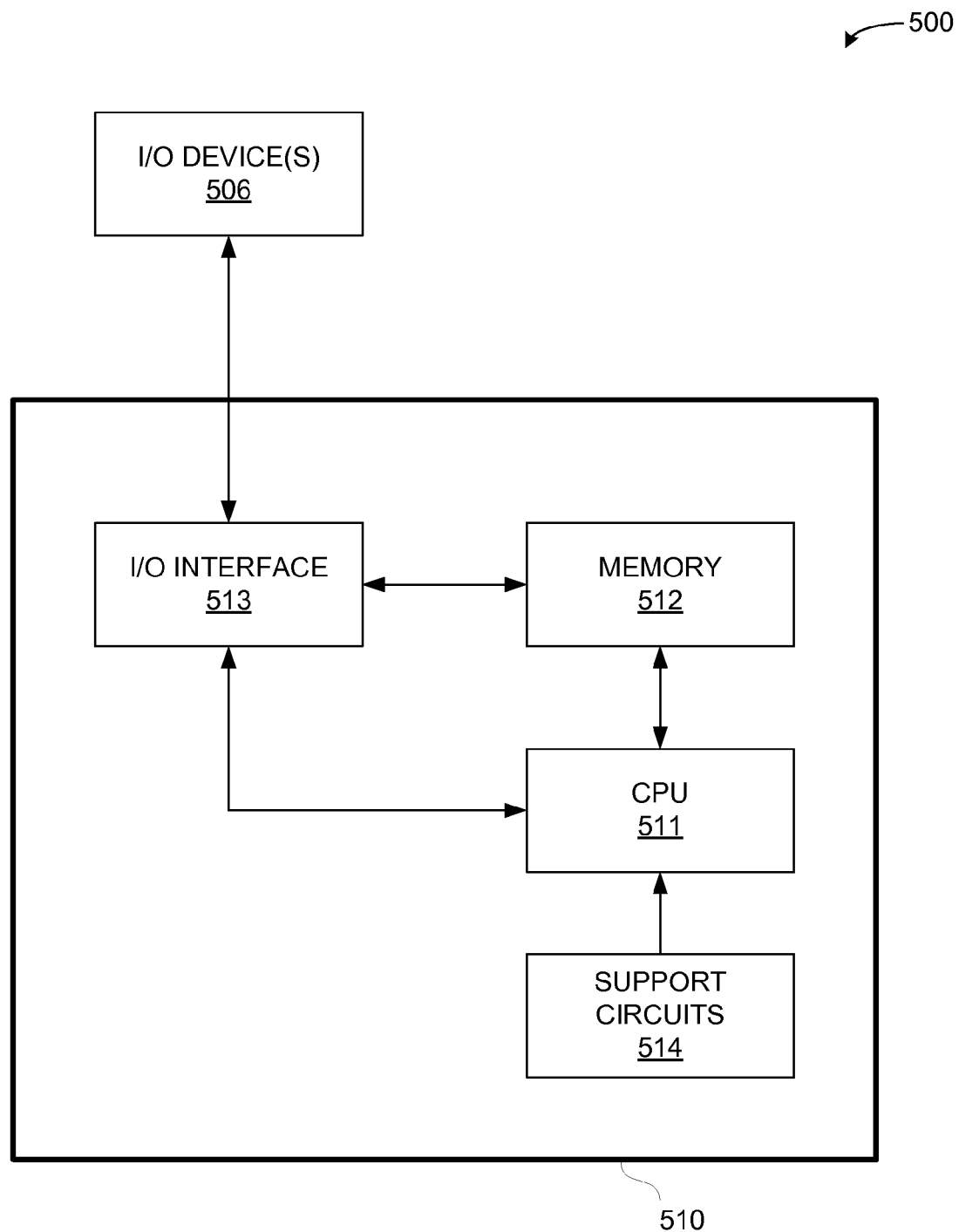
FIG. 5 is a high-level block diagram of an exemplary embodiment of a test system 500.

FIG. 5 is a high-level block diagram of an exemplary embodiment of a test system 500. Test system 500 includes a programmed computer 510.

Programmed computer 510 includes a central processing unit (CPU) 511, memory 512, a variety of support circuits 514, and an input/output (I/O) interface 513. CPU 511 may be any type of microprocessor known in the art. Support circuits 514 for CPU 511 include conventional cache, power supplies, clock circuits, data registers, I/O interfaces, and the like. Memory 512 may be directly coupled to CPU 511 or coupled through I/O interface 513, and I/O interface may be coupled to I/O devices 506, including a conventional keyboard, network, mouse, display printer, and interface circuitry adapted to receive and transmit data, such as data files and the like.

Memory 512 may store all or portions of one or more programs or data to implement processes in accordance with one or more aspects of the invention. Additionally, those skilled in the art will appreciate that one or more aspects of the invention may be implemented in hardware, software, or a combination of hardware and software. Such implementations may include a number of processors independently executing various programs and dedicated hardware or programmable hardware.

Programmed computer 510 may be programmed with an operating system, which may be OS/2, Java Virtual Machine, Linux, Solaris, UNIX, or Windows operating system, among other known platforms. At least a portion of an operating system may be disposed in memory 512. Memory 512 may include one or more of the following random access memory, read only memory, magneto-resistive read/write memory, optical read/write memory, cache memory, magnetic read/write memory, and the like, as well as signal-bearing media as described below.

Program(s) of the program product defines functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-RAM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of one or more aspects of the invention represent embodiments of the invention.

Figure 6:
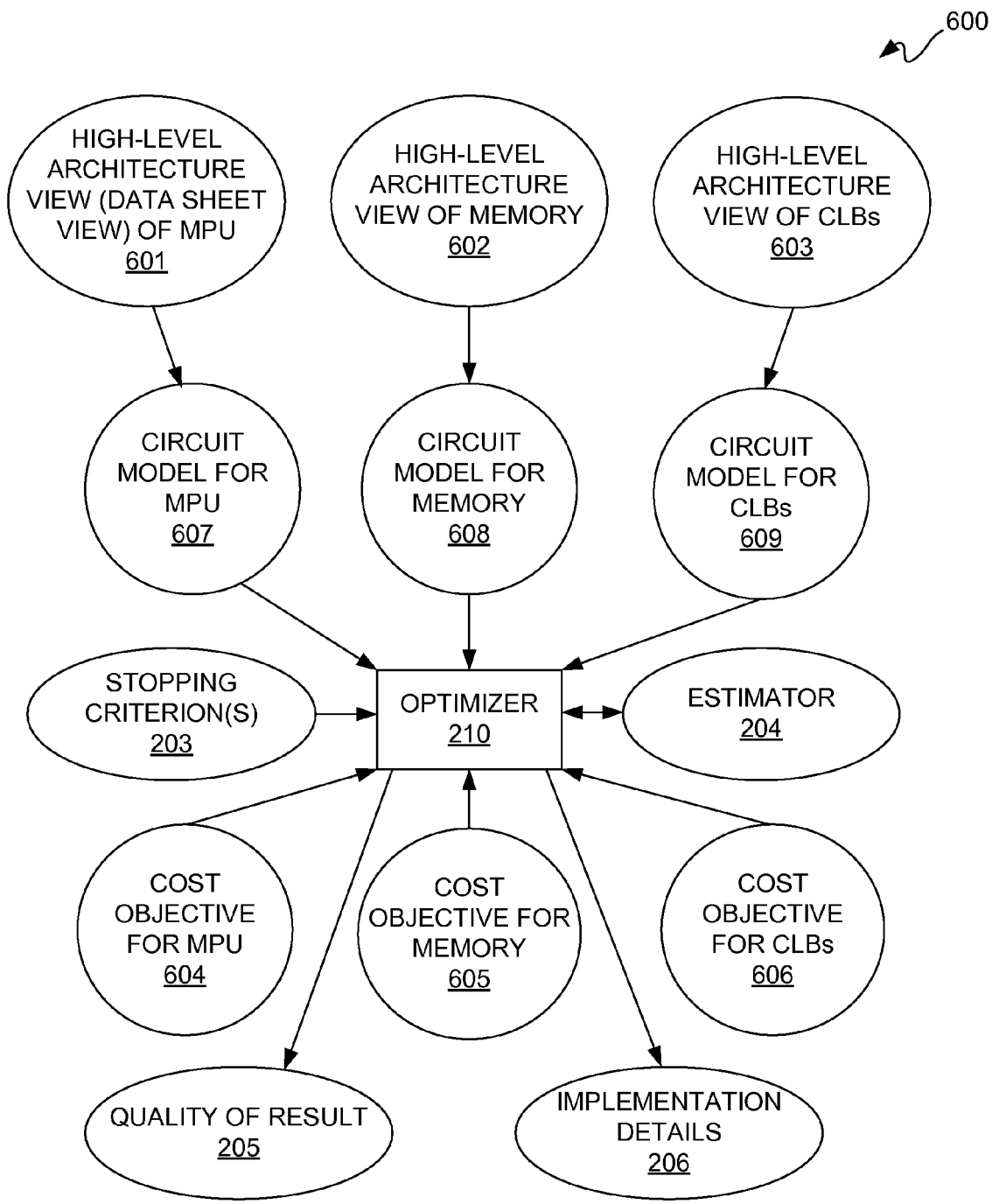
FIG. 6 is a flow diagram depicting an exemplary embodiment of a design optimization tool for a heterogeneous system-on-a-chip ("SOC").

FIG. 6 is a flow diagram depicting an exemplary embodiment of a design optimization tool 600 for a heterogeneous SOC. In this example, the heterogeneous SOC includes a microprocessor unit ("MPU"), memory, and programmable logic such as CLBs. In other words, various types of circuit blocks that may be described at a high-level architectural view or data sheet view and provided as input for forming a heterogeneous SOC. Even though specific circuit blocks are used for purposes of clarity by way of example and not limitation, it should be understood that one or more of these or other known circuit blocks may be used.

A high-level architecture view of an MPU 601 is provided as input to a circuit modeling software tool to generate a circuit model for the MPU at 607. Circuit modeling programs are well known, and thus are not described in unnecessarily detail for purposes of clarity.

A cost objective or function for the MPU 604 is input to optimizer 210. It may be that in a heterogeneous SOC different architectural entities may have different cost functions. In this example, the cost function for an MPU 604 input to optimizer 210 may be primarily to optimize for delay, hence performance. In contrast, the cost function for memory 605 input to optimizer 210 in this example may be primarily to optimize for area. Lastly, the cost function for CLBs 606 input to optimizer 210 may be primarily to optimize for power. Thus, different architectural entities may have different cost functions, and hence multiple cost functions having two or more of delay, area, and energy usage as factors may be input to optimizer 210 for optimization of associated circuit models.

In this example, a high-level architecture view of memory 602 is provided as input to a circuit modeling program, and a high-level architecture view of CLBs 603 is provided as input to a circuit modeling program. These inputs 602 and 603 respectively are used to provide a circuit model for memory 608 and a circuit model for CLBs 609. It should be appreciated that cost functions 604 through 606 correspond to circuit models 607 through 609.

One or more stopping criterions 203 may be input to optimizer 210. Stopping criterions input at 203 may be the same for all cost functions or may be different for different cost functions. Of course, a stopping criterion may be for a percentage of change from one implementation to the next in terms of cost function, where the percentage of change is less than some amount or epsilon.

Again, estimation models 204 may be used for the various cost functions to estimate delay, area, and energy consumption. Thus, for example, an estimation model may be used to determine what the power consumption of CLBs may be for a circuit implementation of such CLBs. The cost function 606 may be used by optimizer 210 to evaluate such power consumption versus another circuit implementation of CLBs. Likewise, an estimation model may be to indicate the amount of area that memory will consume, so that such consumed area may be attempted to be reduced in a subsequent iteration. Lastly, an estimate of delay may be used to determine whether a shorter delay may be used on a next iteration.

Even though the primary cost objective for the MPU in this example was delay, the cost objective may be a combination of cost objectives as previously described. For example, an MPU may have a cost function where the objectives are to optimize delay, power, and area, or any two of these. Likewise, memory and CLBs may be optimized for any two or all three of delay, power, and area. Thus it should be appreciated that within a target implementation, circuits may be optimized for different cost objectives. Other examples follow from these; however, it should be appreciated that there are any of a variety of instances or combinations of cost objectives that may be implemented within the same circuit system.

Optimizer 210 thus may output quality of result 205 and implementation details 206 for each of the MPU input 601, memory input 602, and CLBs input 603. Because optimization is done based on a high-level architecture view, the quality of result 205 and implementation details 206 are not at an extremely low level, such as might be associated with SPICE or VPR, but are more along the lines of an architecture forecast if such an architecture were to be implemented. Because the input is performed at a high-level, the optimization problem is not overly constrained. Hence, the ability to optimize simultaneously along different axis of a problem space, namely power, delay, and area, is facilitated.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for circuit architecture optimization, comprising:
   receiving a plurality of descriptions of a plurality of components of the circuit architecture, wherein the descriptions of the plurality of components are at a high-level associated with a preliminary data sheet level;
   receiving an optimization goal for the components;
   receiving at least one stopping criterion for a cost function;
   iteratively generating implementations for the components to provide a system from a combination of the implementations; and
   iteratively optimizing, using a computer, the implementations of the components until the at least one stopping criterion is satisfied;
   the optimizing including:
      obtaining an estimation model for determining a plurality of cost estimates for the implementations; and
      iteratively optimizing the implementations responsive to the cost estimates.

2. The method according to claim 1, wherein:
   the descriptions of the components include a number of instances of the components and connectivity of the components.

3. The method according to claim 1, wherein the system is described in a form of a netlist.

4. The method according to claim 3, wherein the netlist is selected from a group consisting of a transistor netlist, a switch netlist, a gate netlist, and a register transfer language netlist.

5. The method according to claim 3, wherein the estimation models are selected from a group consisting of a total transistor gate area model, an Elmore delay model, an RC delay model, an electrical effort delay model, and a sum of switched capacitance energy model.

6. The method according to claim 1, further comprising receiving constraint functions for the components.

7. The method according to claim 6, wherein a constraint function of the constraint functions has transistor sizes of the components being greater than a minimum size.

8. The method according to claim 1, wherein the descriptions include type and number of inputs of each of the components.

9. The method according to claim 1, wherein the receiving a plurality of descriptions of components of the circuit architecture is for separate circuit blocks, the separate circuit blocks collectively for providing the system as a heterogeneous system on chip.

10. The method according to claim 9, wherein the separate circuit blocks include configuration logic blocks as a block of the separate circuit blocks.

11. The method according to claim 10, wherein the configuration logic blocks are of a Programmable Logic Device.

12. The method according to claim 1, wherein the optimizing includes non-linear optimization of at least a first portion of the implementations responsive to the cost estimates.

13. The method according to claim 12, wherein the optimizing further includes linear optimization of a second portion of the implementations responsive to the cost estimates.

14. The method according to claim 12, further comprising outputting details of the implementation resulting after the at least one stopping criterion is satisfied.

15. The method according to claim 14, wherein the optimization goals include cost functions for at least two of area, delay, and energy usage.

16. The method according to claim 15, wherein the optimizing further includes obtaining estimation models for determining cost estimates for the at least two of the area, the delay, and the energy usage for the implementations.

17. The method according to claim 16, further comprising outputting quality of result of the details of the implementation output.

18. The method according to claim 17, wherein the quality of result output indicates the delay, the area, and the energy usage for the implementation output.

19. The method according to claim 1, wherein the implementations are generated at a rate that is at least two hundred per second.

20. A non-transitory computer-readable medium having instructions which when executed on a computer perform a method comprising:
receiving a plurality of descriptions of a plurality of components of the circuit architecture, wherein the descriptions of the plurality of components are at a high-level associated with a preliminary data sheet level;
receiving an optimization goal for the components;
receiving at least one stopping criterion for a cost function;
iteratively generating implementations for the components to provide a system from a combination of the implementations; and
iteratively optimizing the implementations of the components until the at least one stopping criterion is satisfied;
the optimizing including:
obtaining an estimation model for determining a plurality of cost estimates for the implementations; and
iteratively optimizing the implementations responsive to the cost estimates.

\* \* \* \* \*